United States Patent [19]

Kountz et al.

[11] 4,257,238

[45] Mar. 24, 1981

[54] MICROCOMPUTER CONTROL FOR AN INVERTER-DRIVEN HEAT PUMP

[75] Inventors: Kenneth J. Kountz, Hoffman Estates, Ill.; Kenneth W. Cooper, York, Pa.; Frederic H. Abendschein, Columbia, Pa.; Lee E. Sumner, Jr., Dallastown, Pa.

[73] Assignee: Borg-Warner Corporation, Chicago, Ill.

[21] Appl. No.: 80,363

[22] Filed: Sep. 28, 1979

[51] Int. Cl.³ .................. F25D 17/04; F25B 1/00
[52] U.S. Cl. ......................... 62/176 B; 62/176 E; 62/180; 62/229; 62/228
[58] Field of Search .................. 62/180, 176 B, 228 B, 62/229, 176 E

[56] References Cited

U.S. PATENT DOCUMENTS

| | | | |
|---|---|---|---|
| 2,279,787 | 4/1942 | Huggins | 62/229 X |
| 2,296,822 | 9/1924 | Wolfert | 62/176 B X |
| 3,214,931 | 11/1965 | Petranek | 62/214 |
| 3,324,672 | 6/1967 | Sones et al. | 62/215 X |
| 3,487,655 | 1/1970 | Dennis et al. | 62/160 |
| 3,514,967 | 6/1970 | Vander Molen | 62/180 |
| 3,667,245 | 6/1972 | Till et al. | 62/180 |
| 4,071,745 | 3/1977 | Hall | 364/104 |
| 4,090,116 | 5/1978 | Lippitt | 318/345 E |

Primary Examiner—Henry C. Yuen
Assistant Examiner—Harry Tanner
Attorney, Agent, or Firm—Thomas B. Hunter

[57] ABSTRACT

An apparatus and method for controlling continuously and discretely the speed of an indoor evaporator fan motor and the speed of the compressor as a function of the fan speed for regulating the dry bulb temperature and relative humidity of a conditioned space includes a programmed control device which produces a first signal for driving a fan inverter connected to the evaporator fan motor. A second signal, which is a function of the first signal, is also provided by the control device to drive a compressor inverter coupled to the compressor. A microprocessor having a program is operatively connected to the programmed control device for controlling its operation to effect the measured temperature of the conditioned space.

9 Claims, 2 Drawing Figures

MICROCOMPUTER CONTROL FOR AN INVERTER-DRIVEN HEAT PUMP

BACKGROUND OF THE INVENTION

1. Field of the Invention

This invention relates generally to refrigeration systems and more particularly, it relates to an apparatus and method for controlling continuously and discretely the speed of an indoor evaporator fan motor and the speed of the compressor as a function of the fan speed for regulating the dry bulb temperature and relative humidity of a conditioned space. The invention has specific applications in air conditioning systems and in reversible heat-pump systems operated in the cooling mode for cooling residential dwellings, small office buildings, mobile homes and the like.

2. Description of the Prior Art

In U.S. Pat. No. 3,324,672 issued on June 13, 1967 to W. L. Sones et al., there is shown an electronically controlled conditioning system having a computer unit and a comfort control programmer for controlling the power applied to a compressor motor and blower motor.

In U.S. Pat. No. 3,214,913 issued on Nov. 2, 1965 to D. J. Petranek, there is disclosed a refrigeration system wherein a compressor is driven by an internal combustion engine via alternating current generator. The combustion engine is designed to operate at two distinct and separate speed ranges. The generator is also arranged to drive a pair of electric motors coupled to respective fans. However, the fan for circulating air within the conditioned space is operated at substantially uniform speed.

In U.S. Pat. No. 3,487,655 issued on Jan. 6, 1970 to D. D. Dennis et al., there is disclosed a heat-pump system which includes a compressor driven by a turbine via an alternator-motor combination. The alternator portion is also utilized to drive the condenser and evaporator fan motors. The compressor and fans are all simultaneously regulated in response to variations in the speed of the turbine.

In U.S. Pat. No. 4,071,741 issued on Jan. 31, 1978 to B. C. Hall, there is shown and described a system for controlling the measured temperature during a sequence of time intervals in conformity with a sequence of selected reference temperatures. Each of the reference temperatures correspond to one of the time intervals.

In U.S. Pat. No. 4,090,116 issued on May 16, 1978 to D. L. Lippitt, there is disclosed a motor control system which includes a data processor adapted to control the speed of an electric motor in response to input variables to the processor.

Heretofore, refrigeration systems have been operated on the basis of an on and off cycling of the compressor in response to measured temperatures which resulted in an inefficient operation due to substantial lag or overshoot of the desired temperature in the conditioned space. Further, this type of on and off cycling causes energy to be wasted due to the transients encountered during start-up and shut-down. There have been attempts to improve the efficiency of the system by operating the compressor more or less continuously. However, it has been discovered that in order to minimize energy consumption there should be a regulation of the speed of the evaporator fan motor in response to the load conditions and the speed of the compressor should be made as a continuous and discrete varying function of the fan speed. Thus, it would be desirable to provide an apparatus and method for controlling continuously and discretely the compressor speed as a varying function of the evaporator fan speed which is dependent upon the load conditions.

SUMMARY OF THE INVENTION

Accordingly, it is a general object of the present invention to provide a new and improved refrigeration system which minimizes the energy consumption.

It is an object of the present invention to provide an apparatus and method for controlling continuously and discretely the compressor speed as a varying function of the evaporator fan speed which is dependent upon the load conditions.

It is another object of the present invention to provide an apparatus and method for use in a refrigeration system for controlling digitally the speed of the evaporator fan motor in response to the load conditions and the speed of the compressor as a varying function of the fan speed for regulating the dry bulb temperature and relative humidity of a conditioned space.

It is still another object of the present invention to provide an apparatus and method utilizing a microprocessor to provide digitally controlled signals for digital regulation of the speed of the indoor evaporator fan motor, the compressor speed being calculated in the microprocessor to be a function of the fan speed.

In accordance with these aims and objectives of the instant invention, there is provided a refrigeration system for conditioning a space which includes a closed refrigerant circuit consisting of a compressor, a condenser, an expansion device, and an evaporator connected respectively in series. The system has a first sensing means for measuring the temperature of the space to be conditioned to generate an electrical signal representative of the measured temperature. A thermostat is provided for setting or selecting the reference temperature of the space to be conditioned which produces a second electrical signal representative of the selected reference temperature. A fan inverter is connected to an evaporator fan motor for controlling continuously and discretely the speed thereof. A compressor inverter is connected to the compressor motor for controlling continuously and discretely the speed thereof. A programmed control device in response to the measured temperature and reference temperature produces a first digital signal for driving the fan inverter and a second digital signal, which is a function of the first digital signal, to drive the compressor inverter. A microprocessor having a program is operatively connected to the programmed control device for controlling the operation thereof to affect the measured temperature of the conditioned space.

BRIEF DESCRIPTION OF THE DRAWINGS

These and other objects and advantages of the present invention will be more fully apparent from the following detailed description when read in conjunction with the accompanying drawings wherein.

DETAILED DESCRIPTION OF THE PREFERRED EMBODIMENT

Figure 1:
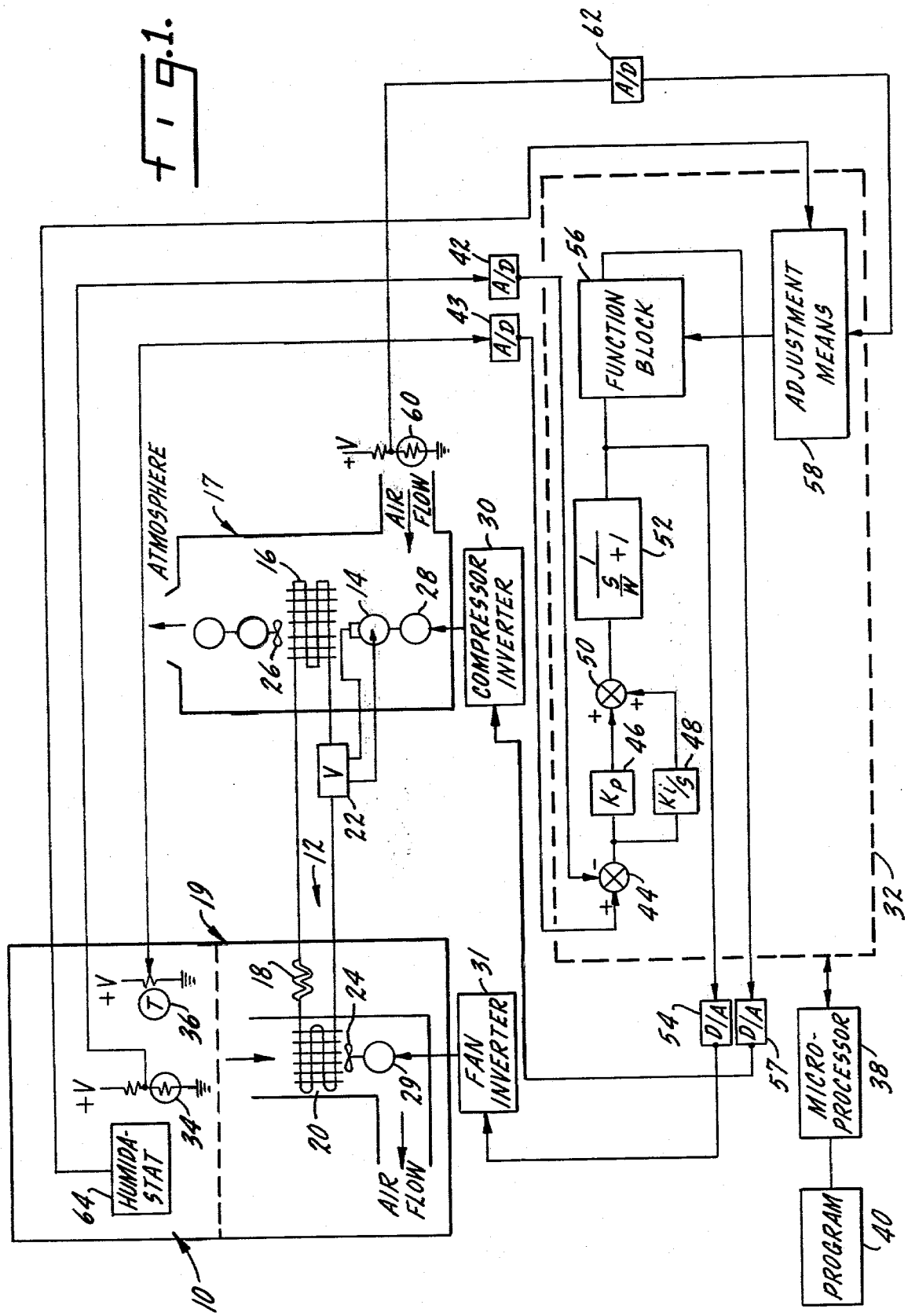
FIG. 1 is an electrical schematic block diagram of the refrigeration system in accordance with the present invention.

Referring now in detail to the drawings, there is shown in FIG. 1 a conditioned space or zone 10, which may be a room or rooms of a residential dwelling, that is provided with a refrigeration system designated generally by reference numeral 12. The refrigeration system 12 consists of the conventional reversible heat-pump type which includes a compressor 14, a first heat exchanger 16 located normally outside and away from the conditioned space 10, an expansion device 18 such as a capillary tube, and a second heat exchanger 20 arranged in fluid communication with the zone 10 connected respectively in series to form a closed refrigerant circuit.

As can be seen, the compressor 14 and the first heat exchanger are housed in an outdoor unit 17 while the expansion device 18 and the second heat exchanger 20 are arranged within an indoor unit 19. During the cooling cycle or mode of operation, the first heat exchanger is functioning as a condenser and the second heat exchanger is operating as an evaporator. The refrigeration system also includes a four-way reversing valve 22 for reversing the direction of refrigerant flow in the first and second heat exchangers so that the first heat exchanger is operated as an evaporator and the second heat exchanger is functioning as a condenser. When the system is made to operate in this reverse manner, this is generally referred to as the heating cycle or mode. The manner of controlling the position of the valve 22 may be conventional and is not shown. For the purposes of discussion hereinafter, it is assumed that the system is being operated in the cooling mode with the heat exchangers 16, 20 being referred to as the condenser and the evaporator, respectively.

An indoor evaporator fan 24 is positioned within the indoor unit 19 in the vicinity of the evaporator 20 for circulating air therethrough and into the conditioned space 10. An outdoor condenser fan 26 is also arranged in the outdoor unit 17 adjacent the condenser 16 for circulating of the air therethrough and out into the atmosphere. The ducts necessary to supply the conditioned air to the space 10 to be cooled and to remove the heated air to the atmosphere have not been shown. The compressor 14 is driven by a variable-speed electric motor 28 whose speed is controlled by motor speed control means such as a compressor inverter 30. The inverter 30 may be of any conventional type well-known in the art and is utilized to provide an A-C voltage which is of a varying amplitude and frequency. It should be noted that the change in the speed of the motor and thus the compressor speed are directly proportional to changes in the frequency within the standard speeds of operation. Similarly, the indoor evaporator fan 24 is driven by a variable-speed electric motor 29 which is controlled by motor speed control means such as an indoor fan inverter 31.

The refrigeration system is provided with a programmed control means 32 which is responsive in part to the temperatures of the conditioned space 10 as measured continuously by temperature-measuring means consisting of a temperature-sensitive resistance such as thermistor 34. The details of the programmed control means 32 will be described more fully hereinafter. The control means 32 is also responsive to the desired variable temperature setting or reference temperature of the conditioned space as determined by thermostat 36 which has been shown schematically.

The system further includes a data processor designated generally as a microprocessor 38 having a program 40 for controlling the overall operation of the control means 32 in allowing reading of inputs from the thermistor 34 and the thermostat 36. It should be understood that while the microprocessor 38 has been shown, the present invention can also be implemented with various solid-state electronic components such as discrete logic circuit chips interconnected to perform the desired function. The microprocessor 38 illustrated in FIG. 1 may be of any one of a number of general purpose programmable digital computers which are commonly available at present. One such microcomputer suitable for application in this invention is a microprocessor sold by Texas Instruments designated as TMS 1100 which contains a read-only-memory (ROM), a random-access-memory (RAM) and an arithmetic logic unit (ALU) on a single semiconductor chip. Another processor which can be utilized in practicing the instant invention is a general purpose microcomputer sold by Digital Equipment Corporation referred to as PDP-11/03 system.

The thermistor 34 produces an electrical analog signal which is proportional and representative of the present actual measured temperature in the conditioned space where the temperature is to be controlled. This analog signal is passed through an analog-to-digital (A/D) converter 42 which provides a digital representation of the temperature measured by the thermistor 34 to the control means 32. The thermostat 36 provides also an electrical signal, either analog or digital, which is proportional to and representative of the reference temperature or desired temperature setting of the conditioned space 10. If an analog signal is produced from the thermostat 36, it is again sent through an A/D converter 43 to generate a digital representation of the dry bulb temperature setting on the thermostat.

The programmed control means includes a first summer 44 which adds algebraically the digital representation of the dry bulb set point and the continuously measured temperature to provide an error signal. This error signal is fed to a proportional gain amplifier 46 with a gain of $K_p$(hz/°F.) and in integrator 48 with a transfer function of $K_{i/s}$ (hz/sec - °F.). The digital output signal from the amplifier 46 and the integrator 48 are added by a second summer 50. The digital output signal from the summer 50 is sent to a digital filter 52 having a transfer function of $1/(s/w+1)$ (wherein W has units of radians/sec). The digital output signal of the digital filter 52 is utilized to control the firing angle for the proper triggering or turning-on of the silicon-controlled rectifiers (SCR's) through a conventional bridge rectifier within the indoor evaporator fan inverter means 31 via a digital-to-analog converter (D/A) or interface 54. The analog output signal from the D/A converter 54 controls the speed of the indoor evaporator fan 24 via the inverter 31 and the fan motor 29. The output signal from the digital filter 52 is also sent to a function block 56 for determination of the speed of the compressor 14. The relationships of the evaporator fan speeds and the compressor speeds are shown in detail in FIG. 2 and will be described below. The digital signal from the block 56 is passed through a D/A converter 57 to produce an analog signal for controlling the speed of the compressor 14 via the compressor inverter 30 and the electric motor 28.

Figure 2:
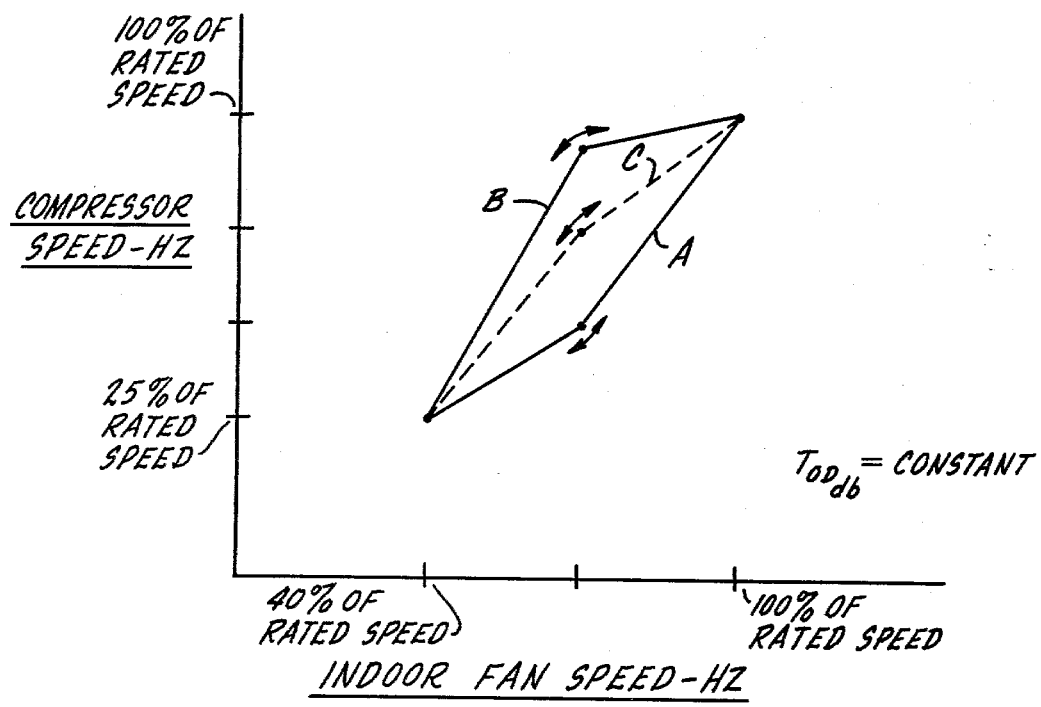
FIG. 2 is a graphical representation of the relationship of the compressor speeds and evaporator fan speeds for optimal energy efficiency and maximum dehumidification.

The graphs of FIG. 2 shows the relationships of compressor speeds as a function of evaporator fan speeds at a constant outdoor temperature. The curve A on FIG. 2 has been empirically determined, i.e., laboratory test, to be the optimal path of operation for maximum energy efficiency ratio (EER). In FIG. 2, the horizontal axis or abscissa represents the speed of the indoor evaporator fan between minimum and maximum allowable speeds. The minimum speed of the fan is approximately 40% of rated-speed and the maximum speed is the full rated-speed (100%). The vertical axis or ordinate represents the speeds of the compressor between minimum and maximum allowable speeds. The minimum speed of the compressor is approximately 25% of the design or rated-speed and the maximum speed is the full rated-speed (100%).

As can be appreciated, the thermal load demand on the system will vary from time to time dependent upon a number of factors including variations in the indoor and outdoor temperatures. Thus, an adjustment means 58 is provided within the control means 32 to modify the relationship of the fan speed and the compressor speed, i.e., changing the slopes of the lines in curve A as a function of the indoor relative humidity as sensed by a humidistat 64. In addition, the adjustment means 58 can be made to be responsive to the outdoor temperature for further modifying or limiting such relationship to provide optimum EER. To this end, a thermistor 60 is included to generate an electric analog signal representative of the outdoor temperature and is sent through an A/D converter 62 to the adjustment means 38. The output of the adjustment means 58 is fed as another input to the function block 56. It should be clear to those skilled in the art that the functional relationship set forth in the block 56 and the adjustment means 38 can be programmed into the microprocessor 38 via the program 40 to step through a sequence of instructions to command these desired functions.

In operation, the program 40 controls the reading of inputs from the thermistor 34, thermistat 36 and thermistor 60 via the respective A/D converters 42, 43 and 62 and the humidistat 64 and provides for calculating of a first digital signal for driving the A/D converter 54 to regulate the speed of the indoor evaporator fan motor. Under the control of the microprocessor 38, the control means 32 calculates a second digital signal for driving the D/A converter 57 to regulate the speed of the compressor which is a function of the speed of the indoor fan motor as shown and described above with respect to FIG. 2. The proportional gain amplifier 46, the integrator 48 and the second summer 50 provide a control loop with lead compensation for minimizing the error signal from the first summer 44 at steady-state conditions and for cancelling the effect of the lag time in the measured dry bulb temperature reaching the desired temperature in response to changes in the fan motor speed and compressor speed. The digital filter 52 has been designed to remove any spurious noise in the measured temperature and/or in the operation of the A/D converters 42 and 43.

While the operation of the compressor speed as a function of a fan speed is in accordance with the curve A in FIG. 2 realizes maximum energy efficiency, it does not necessarily provide the best comfort condition due to the amount of humidity in the environment. Thus, the curve A is used only where the relative humidity is 60% or less. Operation of the compressor and fan along the curve B provides for maximum dehumidification. The allowable area for operation of the system is defined between the curves A and B. Typically, the system can be operated on one of a family of curves between the curves A and B such as curve C. As the amount of humidity is increased, the operation of the system shifts gradually in an incremental manner from curve to curve within the area between the curves A and B in response to the relative humidity. The humidistat 64 has been provided to measure the relative humidity and to generate an electrical digital signal. This digital signal is used to modify the adjustment means 58 to vary incrementally the operating point on the various curves. This path in which the system operates will minimize the energy consumption while still satisfying the space dry bulb setting and relative humidity set point.

In practice, the digital signal from the humidistat 64 provides an indication of whether a switch contact is open or closed. A closed switch contact indicates that the relative humidity is 60% or less while an open switch contact denotes that the relative humidity is over 60%. Upon sensing this digital signal at predetermined time intervals, the adjustment means 58 responds to alter the operating point on the various curves. Specifically, if the switch contact is closed operation will shift gradually in a discrete manner towards curve A. On the other hand, if the switch contact is open operation will move gradually in a discrete manner towards curve B.

From the foregoing description of the refrigeration system embodying the present invention, it can be seen that there is provided an apparatus and method for controlling continuously and discretely the speed of an indoor evaporator fan and the speed of the compressor as a function of the fan speed for regulating the dry bulb temperature and relative humidity of a conditioned space so as to minimize energy consumption. The refrigeration system is controlled in its overall operation by a microprocessor having a program to affect control of the measured temperature in a conditioned space.

While there has been illustrated and described what is considered at present to be a preferred embodiment of the present invention, it will be understood by those skilled in the art that various changes and modifications may be made and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out this invention, but the invention will include all embodiments falling within the scope of the appended claims.

What is claimed is:

1. A refrigeration system for conditioning a space and having a closed refrigerant circuit including a compressor, a condenser, an expansion device, and an evaporator connected respectively in series, said system comprising:

first sensing means for measuring the actual temperature of a space to be conditioned and generating an electrical signal representative of the measured temperature;

means for setting a reference temperature of the space to be conditioned and generating a second electrical signal representative of the reference temperature;

second sensing means for measuring the relative humidity and generating a third electrical signal representative of the reference temperature;

evaporator fan motor for driving a fan to direct air into the conditioned space;

first motor speed control means connectable to said evaporator fan motor for controlling continuously and discretely the speed thereof;

compressor motor for driving the compressor;

second motor speed control means connectable to said compressor motor for controlling continuously and discretely the speed thereof;

programmed control means for generating a first digital signal responsive to said measured temperature and said reference temperature to drive said first motor speed control means and a second digital signal which is a function of said first digital signal and said relative humidity to drive said second motor speed control means; and data processor means having a program coupled to said programmed control means for controlling the operation thereof to affect a measured temperature and relative humidity of the conditioned space.

2. A refrigeration system as claimed in claim 1, further comprising third sensing means for measuring the temperature of the outdoor atmosphere and generating a fourth electrical signal representative of the outdoor atmospheric temperature, and wherein said programmed control means including means responsive to said fourth signal for modifying incrementally the functional relationship of said first and second digital signals.

3. A refrigeration system as claimed in claim 2, wherein said modifying means increases gradually and incrementally the compressor speed with respect to the fan speed when more dehumidification is required as sensed by said second sensing means.

4. A refrigeration system as claimed in claim 1, wherein said programmed control means includes a first summer which compares the actual measured temperature with the reference temperature to provide an error signal.

5. A refrigeration system as claimed in claim 4, wherein said control means further includes a second summer, a proportional gain amplifier and an integrator arranged in a closed loop and being responsive to said error signal for minimizing the steady-state error between the measured temperature and the reference temperature.

6. A refrigeration system as claimed in claim 5, wherein said control means further includes a digital filter connected to said second summer to remove noise within the system.

7. A refrigeration system as claimed in claim 1, wherein said data processor means comprises a microprocessor.

8. A refrigeration system as claimed in claim 1, wherein each of said first and second sensing means comprises a thermistor.

9. A method for use in a refrigeration system for conditioning a space having a closed refrigerant circuit including a compressor, a condenser, an expansion device, and an evaporator connected respectively in series, said method comprising the steps:

sensing the actual temperature of a space to be conditioned to generate an electrical signal representative of the measured temperature;

setting a reference temperature of the space to be conditioned to generate a second electrical signal representative of the selected reference temperature;

sensing the relative humidity to generate a third electrical signal representative of the relative humidity;

providing an evaporator fan motor for driving a fan to direct air into the conditioned space;

connecting a first motor speed control device to the evaporator fan motor for controlling continuously and discretely the speed thereof;

providing a compressor motor for driving the compressor;

connecting a second motor speed control device to the compressor motor for controlling continuously and discretely the speed thereof;

generating a first digital signal in response to the measured temperature and the reference temperature to drive the first motor speed control device and a second digital signal which is a function of the first digital signal and the relative humidity to drive the second motor speed control device; and controlling through a microprocessor having a program the step of generating the first and second digital signals to affect the measured temperature and relative humidity of the conditioned space.

* * * * *